(12) United States Patent
Go et al.

(10) Patent No.: US 11,968,342 B2
(45) Date of Patent: Apr. 23, 2024

(54) IMAGE READING DEVICE CAPABLE OF GENERATING TAG ABOUT DOCUMENT AND IMAGE FORMING APPARATUS WITH THE SAME

(71) Applicant: KYOCERA Document Solutions Inc., Osaka (JP)

(72) Inventors: Keanu Go, Osaka (JP); Eliot Emerson Uy, Osaka (JP); Romel Dianon, Jr., Osaka (JP); Roy Vincent Maranon, Osaka (JP); Peter James Bulat-Ag, Osaka (JP); J'mark Ramos, Osaka (JP); Gerald Galanida, Osaka (JP); Hazel Ozon, Osaka (JP); Fritzer Abapo, Osaka (JP); Maria Johanna Ybanez, Osaka (JP); Kenneth Kienzle Arrieta, Osaka (JP); July Descartin, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/218,132

(22) Filed: Jul. 5, 2023

(65) Prior Publication Data
US 2024/0022675 A1  Jan. 18, 2024

(30) Foreign Application Priority Data
Jul. 12, 2022 (JP) ................. 2022-111878

(51) Int. Cl.
*H04N 1/21* (2006.01)
*G06F 16/16* (2019.01)
(Continued)

(52) U.S. Cl.
CPC .......... *H04N 1/2166* (2013.01); *G06F 16/16* (2019.01); *G06F 21/6218* (2013.01);
(Continued)

(58) Field of Classification Search
CPC ............ H04N 1/0023; H04N 1/00238; H04N 1/00331; H04N 1/00336; H04N 1/2166;
(Continued)

(56) References Cited

U.S. PATENT DOCUMENTS 6,721,451 B1 * 4/2004 Ishitani ................ G06V 30/416
715/236
8,208,173 B2 6/2012 Hinaga
(Continued)

OTHER PUBLICATIONS

Blei et al., "Latent Dirichlet Allocation", Journal of Machine Learning Research 3, 2003, 993-1022 (Year: 2003).*

*Primary Examiner* — Scott A Rogers
(74) *Attorney, Agent, or Firm* — IP Business Solutions, LLC

(57) ABSTRACT

An image forming apparatus includes a storage device and a control device. The storage device stores a document. The control device includes a processor and functions, through the processor executing a control program, as a character recognizer and a tag generator. The character recognizer analyzes the document stored in the storage device and recognizes characters contained in the document. The tag generator analyzes, based on a recognition result of the character recognizer, a sequence of characters contained in the document and generates a tag expressing a feature of descriptive content of the document.

12 Claims, 7 Drawing Sheets

(51) Int. Cl.
*G06F 21/62* (2013.01)
*G06V 30/413* (2022.01)
*H04N 1/00* (2006.01)
*H04N 1/44* (2006.01)

(52) U.S. Cl.
CPC ......... *G06V 30/413* (2022.01); *H04N 1/0023* (2013.01); *H04N 1/00238* (2013.01); *H04N 1/00331* (2013.01); *H04N 1/00336* (2013.01); *H04N 1/444* (2013.01); *H04N 2201/0094* (2013.01)

(58) Field of Classification Search
CPC ...... H04N 1/444; G06V 30/41; G06V 30/413; G06V 30/42; G06V 30/422; G06F 16/16; G06F 21/6218
See application file for complete search history.

(56) References Cited

U.S. PATENT DOCUMENTS

| | | | |
|---|---|---|---|
| 10,157,178 B2 * | 12/2018 | McManis, Jr | G06F 40/216 |
| 10,229,184 B2 * | 3/2019 | English | G06F 16/93 |
| 10,242,002 B2 * | 3/2019 | English | G06F 16/93 |
| 11,210,511 B2 * | 12/2021 | Saha | G06V 30/413 |
| 2014/0013220 A1 * | 1/2014 | Ohguro | G06F 40/12 |
| | | | 715/256 |
| 2023/0260310 A1 * | 8/2023 | Rangarajan | G06V 30/414 |
| | | | 382/176 |

* cited by examiner

Fig.4

| DETAILS | | CLOSE |
|---|---|---|
| FILE NAME | box00000001 | |
| DATE | 11/11/2022 11:11 | |
| DATE SIZE | 26 KB | |
| TAG | POLITICS, ECONOMICS, FINANCE, EDUCATION, CULTURE, SPORTS, INTERNATIONAL, SOCIETY, MUSIC | DETAILS — B31 |

473

D2

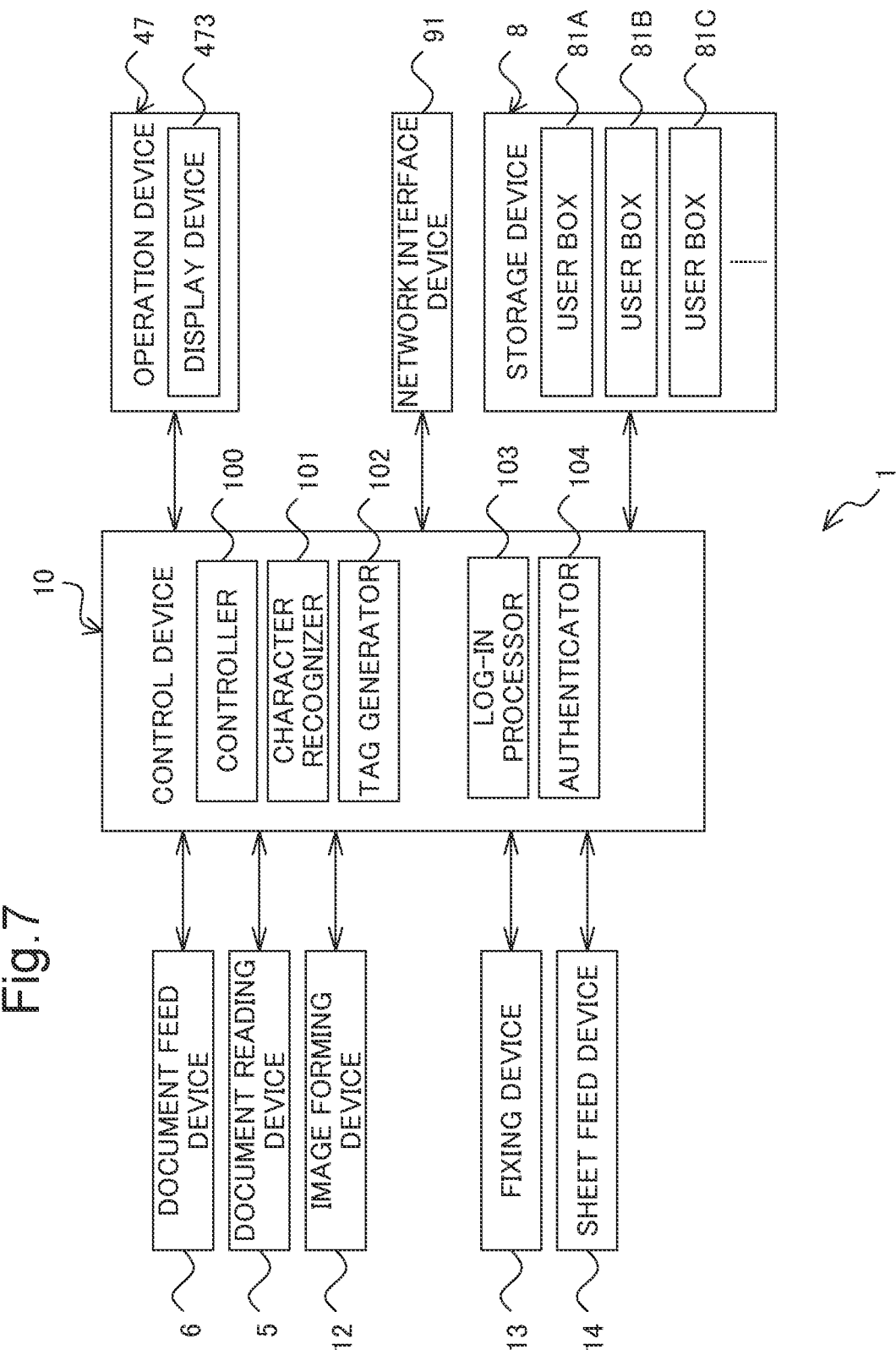

IMAGE READING DEVICE CAPABLE OF GENERATING TAG ABOUT DOCUMENT AND IMAGE FORMING APPARATUS WITH THE SAME

INCORPORATION BY REFERENCE

This application claims priority to Japanese Patent Application No. 2022-111878 filed on Jul. 12, 2022, the entire contents of which are incorporated by reference herein.

BACKGROUND

The present disclosure relates to a technique for searching for documents stored in a storage device.

There is an image forming apparatus that includes a storage device for storing documents and prints the documents stored in the storage device. Furthermore, for example, a device is known which generates a file name of an image file (a document) based on an already prepared or newly created template.

SUMMARY

A technique improved over the aforementioned technique is proposed as one aspect of the present disclosure.

An image reading device according to an aspect of the present disclosure includes a storage device and a control device. The storage device stores a document. The control device includes a processor and functions, through the processor executing a control program, as a character recognizer and a tag generator. The character recognizer analyzes the document stored in the storage device and recognizes characters contained in the document. The tag generator analyzes, based on a recognition result of the character recognizer, a sequence of characters contained in the document and generates a tag expressing a feature of descriptive content of the document.

An image forming apparatus according to another aspect of the present disclosure includes the image reading device according to the one aspect of the present disclosure and an image forming device. The image forming device forms an image on a recording medium to print the image. The control device further functions, through the processor executing a control program, as a controller that allows the image forming device to execute printing of document image represented by the document stored in the storage device.

BRIEF DESCRIPTION OF THE DRAWINGS

FIG. 4 is a view showing another example of an operation screen displayed on the display device.

FIG. 7 is a functional block diagram schematically showing an essential internal configuration of an image forming apparatus according to a fourth embodiment of the present disclosure.

DETAILED DESCRIPTION

Figure 1:
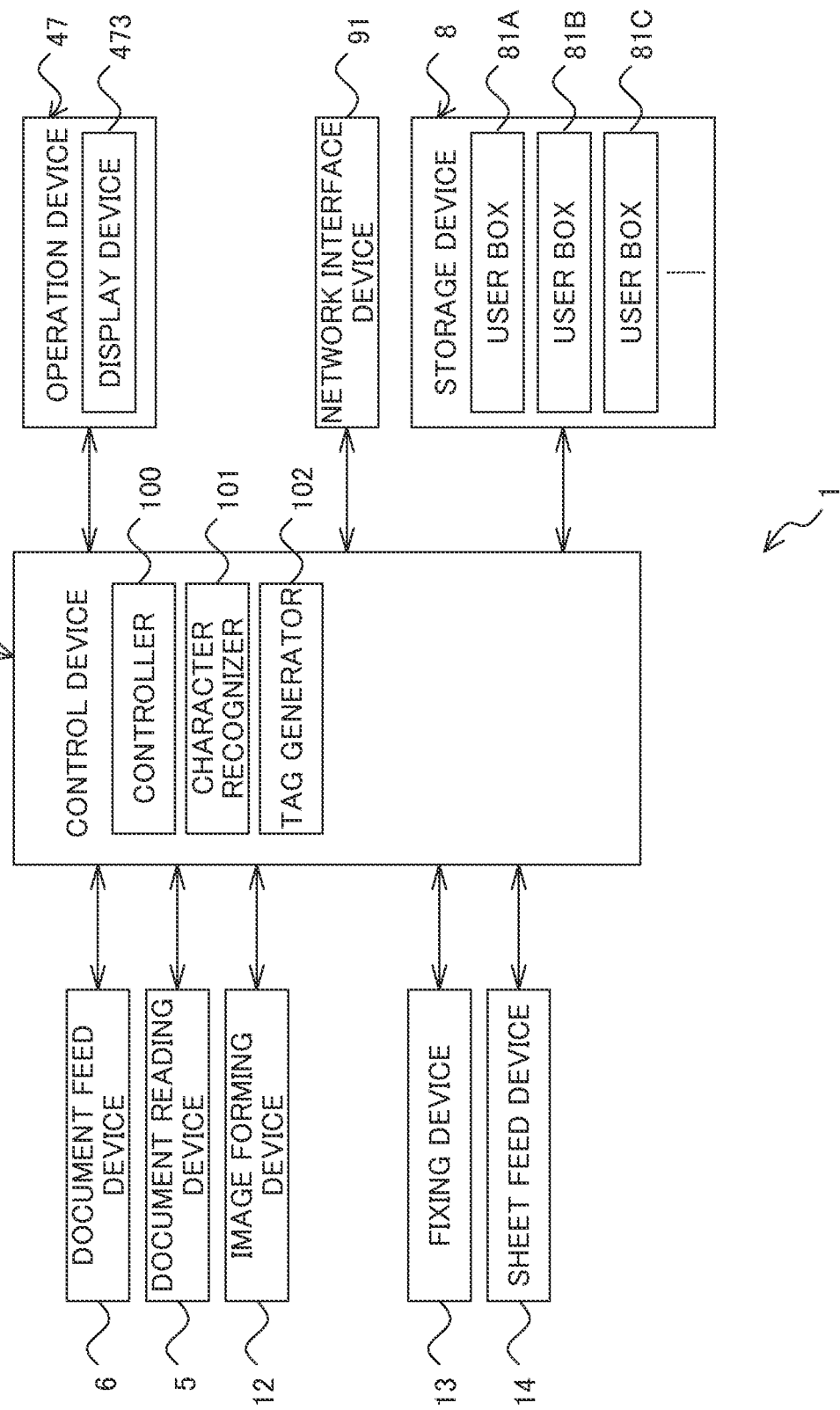
FIG. 1 is a functional block diagram schematically showing an essential internal configuration of an image forming apparatus according to an embodiment of the present disclosure.

Hereinafter, a description will be given of an image reading device and an image forming apparatus according to an embodiment of the present disclosure with reference to the drawings. FIG. 1 is a functional block diagram schematically showing an essential internal configuration of the image forming apparatus according to the embodiment of the present disclosure.

The image forming apparatus 1 according to a first embodiment is a multifunction peripheral having multiple functions including, for example, a copy function, a print function, a scan function, and a facsimile function.

The image forming apparatus 1 is made up by including a control device 10, a document feed device 6, a document reading device 5, an image forming device 12, a fixing device 13, a sheet feed device 14, an operation device 47, a network interface device 91, and a storage device 8.

The document feed device 6 is mounted on the top surface of the document reading device 5 by unshown hinges or the like and is thus openable and closable with respect to the document reading device 5. The document feed device 6 functions as a document holding cover when the document reading device 5 reads a sheet of original document placed on an unshown platen glass. Furthermore, the document feed device 6 is an ADF (auto document feeder), includes an unshown document loading tray, and feeds a sheet of original document loaded on the document loading tray to the document reading device 5.

First, a description will be given of the case where a document reading operation is performed on the image forming apparatus 1. The document reading device 5 optically reads an image of a sheet of original document fed to the document reading device 5 by the document feed device 6 or an image of a sheet of original document placed on the platen glass and generates image data on the original document. The image data generated by the document reading device 5 is stored in an unshown image memory or the like.

Next, a description will be given of the case where an image forming operation is performed on the image forming apparatus 1. Based on image data generated by the document reading operation, image data stored in the image memory or the like, image data received from a computer connected via a network or another image data, the image forming device 12 forms a toner image on a recording paper sheet as a recording medium fed from the sheet feeder 14.

The fixing device 13 applies heat and pressure to the recording paper sheet with the toner image formed thereon by the image forming device 12, thus fixing the toner image on the recording paper sheet. The sheet subjected to the fixation processing is discharged to an unshown sheet output tray. The sheet feed device 14 includes a sheet feed cassette.

The operation device 47 includes numeric keys or hardware keys. The operation device 47 accepts operator's instructions for various types of operations and processing executable by the image forming apparatus 1, such as an instruction to execute an image forming operation, according to operations on the numeric keys or hardware keys. The operation device 47 includes a display device 473 that displays operation guidance and other types of information for the operator. Furthermore, the operation device 47 accepts, through a touch panel provided on the display device 473, input of a user's instruction based on an operation (a touch gesture) of a user on the operation screen displayed on the display device 473.

The display device 473 is formed of a liquid crystal display (LCD) or the like. The display device 473 is provided with the touch panel. When the operator makes a gesture touching a button or key displayed on the screen, an instruction associated with the position where the touch gesture has been made is accepted through the touch panel.

The network interface device 91 is a communication interface that performs sending and receiving of various types of data to and from an external device (for example, a personal computer) on a local area network or on the Internet.

The storage device 8 is a large storage device, such as an HDD (hard disk drive) or an SSD (solid state drive), and stores various control programs and others. Furthermore, the storage device 8 includes a plurality of user boxes 81A to 81C (hereinafter, referred to simply as "user boxes 81").

The user boxes 81 are part of a storage area in the storage device 8 and stores documents (pieces of document data), each in association with attribute information on the document (for example, a file name, a date of storage, and a data size). For example, the user box 81 stores, as a document, a file of a document described in data form compatible with a word processor or spreadsheet software, a file of image data obtained by reading of the document reading device 5 or a file of image data received via a network.

Furthermore, the user boxes 81 include, through segmentalization of the storage area described above, three types of user boxes: a "shared" box accessible by all users; a "personal" box accessible by a logged-in user only; and a "group" box which can be used in a group. The "personal" box and the "group" box store, on a document-by-document basis, credentials for use in user authentication in association with each document. The user boxes 81 are an example of the storage device defined in CLAIMS.

The control device 10 is made up by including a processor, a RAM (random access memory), a ROM (read only memory), and a dedicated hardware circuit. The processor is, for example, a CPU (central processing unit), an ASIC (application specific integrated circuit) or an MPU (micro processing unit). The control device 10 includes a controller 100, a character recognizer 101, and a tag generator 102.

When the processor operates in accordance with a control program stored in the storage device 8, the control device 10 functions as the controller 100, the character recognizer 101, and the tag generator 102. However, each of the controller 100 and the other components may not be implemented by the operation of the processor in accordance with the control program but may be constituted by a hardware circuit. Hereinafter, the same applies to the other embodiments unless otherwise stated.

The controller 100 governs the overall operation control of the image forming apparatus 1. The controller 100 is connected to the document feed device 6, the document reading device 5, the image forming device 12, the fixing device 13, the sheet feed device 14, the operation device 47, the network interface device 91, and the storage device 8 and controls the operations of these components. For example, the controller 100 controls the operations of the image forming device 12 and other components to allow these components to form on a recording paper sheet as a recording medium a document image obtained by reading of the document reading device 5.

The character recognizer 101 analyzes, using an existing OCR (optical character recognition) technique, an image-data-based document stored in the user box 81 and recognizes characters contained in the document. Alternatively, the character recognizer 101 recognizes characters contained in a document file in a data format compatible with a word processor or spreadsheet software, using an application for use in decrypting files in the data format.

The tag generator 102 analyzes, based on the recognition result of the character recognizer 101, a sequence of characters contained in the document using the existing latent dirichlet allocation (LDA) method and generates tags for document content represented in the above document. The LDA is a type of topic model for estimating latent topics of a document.

For example, the tag generator 102 subjects the sequence of characters contained in the document to preprocessing, such as word segmentation processing, word normalization processing (for example, unification of characters into one-byte codes or two-byte codes or conversion of upper cases to lower cases), and/or processing for deleting stop words (for example, prepositions, conjunctions, pronouns, and articles), then analyzes the sequence of characters using the LDA, sets the number of topics to maximize the coherence score serving as an evaluation indicator for a topic model, thus generating the topic model.

Thereafter, the tag generator 102 extracts a single or plurality of topics from the generated topic model, adopts the extracted topics as tags, and stores, as attribute information on the document, tag information representing the tags in the user box 81.

Figure 2:
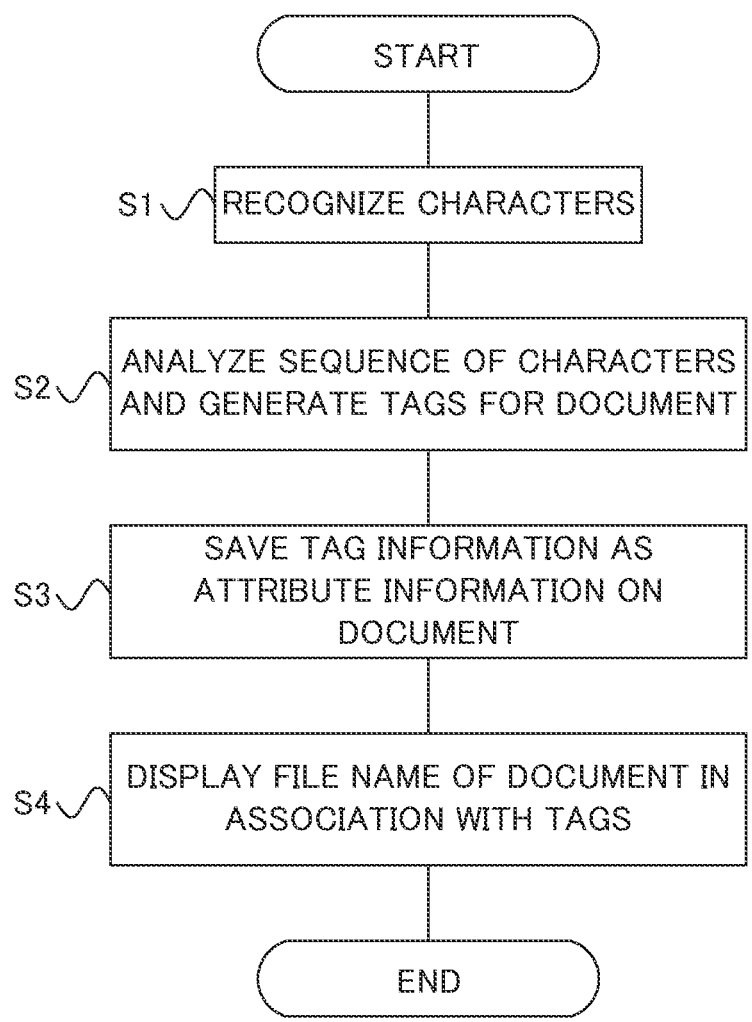
FIG. 2 is a flowchart showing an example of processing executed by a control device of the image forming apparatus.

Next, a description will be given of processing performed by the control device 10 when the user instructs to expand the user box 81 through the operation device 47, with reference to the flowchart shown in FIG. 2.

When, through a user's operation, the operation device 47 accepts an instruction to select a single user box 81 from the plurality of user boxes 81 and expand the selected user box 81, the character recognizer 101 analyzes, using the OCR technique, documents stored in the user box 81 selected by the user and recognizes characters contained in the documents (S1).

Subsequently, the tag generator 102 analyzes, based on the recognition result of the character recognizer 101, a sequence of characters contained in each of the documents, generates tags about the document (S2), and stores, as attribute information on the document, tag information representing the generated tags in the user box 81 (S3).

Figure 3:
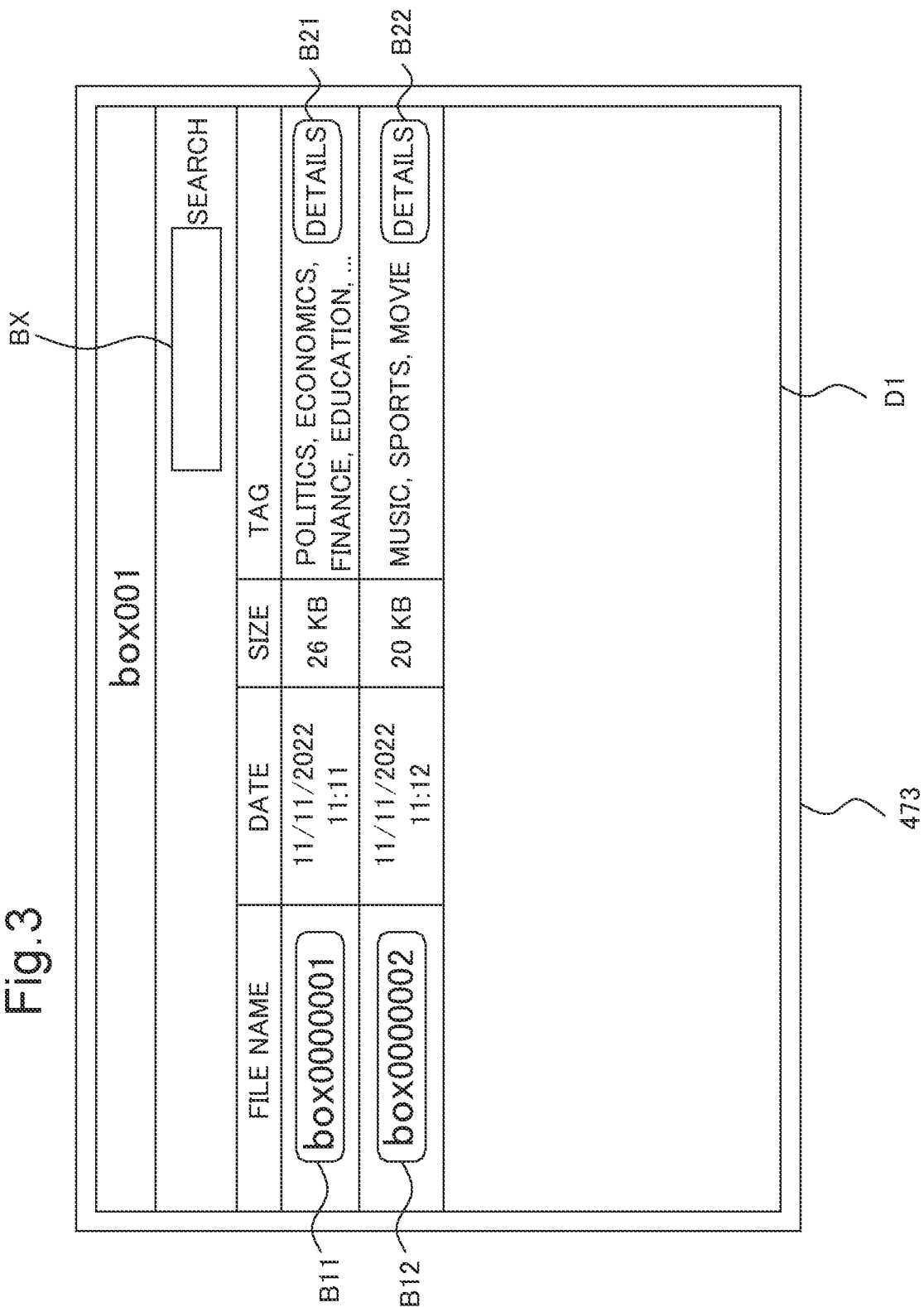
FIG. 3 is a view showing an example of an operation screen displayed on a display device.

The controller 100 allows the display device 473 to display, based on the attribute information on the documents stored in the user box 81 selected by the user, the file names of the documents in association with their tags as shown as an example in FIG. 3 (S4). Thereafter, the processing ends.

FIG. 3 is a view showing an example of an operation screen displayed on the display device 473 by the controller 100. On an operation screen D1 having a title of "box001" (the name of the user box 81), selection buttons B11, B12 with the file names of the documents displayed thereon are arranged vertically in line and, in association with the file name of each document, the date of storage (Date), the data size (Size), tags, and an operation button B21, B22 accepting an instruction to display details of the document are displayed.

Each generated tag has a predetermined degree of importance. The tag generator 102 stores the degree of importance of the tag. The controller 100 obtains information representing the degrees of importance of the tags from the tag generator 102 and allows the display device 473 to preferentially display a tag having a higher degree of importance as a higher-priority tag. The controller 100 treats a tag given no degree of importance as a lowest-ranked tag. The phrase "preferentially display a tag having a higher degree of importance" means that, in the example of the operation screen D1, the tags are displayed in descending order of priority from the left side (or the top side) in FIG. 3. Other examples include (i) to display a tag having a higher degree of importance in larger-sized characters (a larger font) and (ii) to display a tag having a higher degree of importance in a more prominent display manner. The degree of importance of each tag may be set by default by the tag generator 102 or may be set according to a user's specification accepted through the operation device 47.

When the operation device 47 accepts, based on a user's gesture on the selection button B11 displayed on the operation screen D1, specification of the document having a file name of "box0000001" as a document of interest, the controller 100 allows the display device 473 to display, based on document content of the document having a file name of "box0000001", a preview of the document. This allows the user to confirm whether to execute printing of the document. When the operation device 47 accepts an instruction to execute the printing from the user, the controller 100 allows the image forming device 12 to perform the printing of the document.

The operation screen D1 also displays a search box BX into which a search string concerning a tag can be entered. When the operation device 47 accepts, through a user's operation on the operation device 47, an entry of a search string into the search box BX and also accepts an instruction to execute search from the user, the controller 100 searches for any document having a tag corresponding to the entered search string and allows the display device 473 to display the file name of the document extracted by the search.

Furthermore, when the operation device 47 accepts, based on a user's gesture on the operation button B21 displayed on the operation screen D1, an instruction to display attribute information on a specific document (the document having a file name of "box0000001" in this example), the controller 100 allows the display device 473 to display only information on the document having a file name of "box0000001" as shown as an example in FIG. 4.

FIG. 4 is a view showing an example of an operation screen displayed on the display device 473 by the controller 100. On an operation screen D2 having a title of "Details", the attribute information on the document having a file name of "box0000001" and an operation button B31 instructing to display all tags are displayed.

Figure 5:
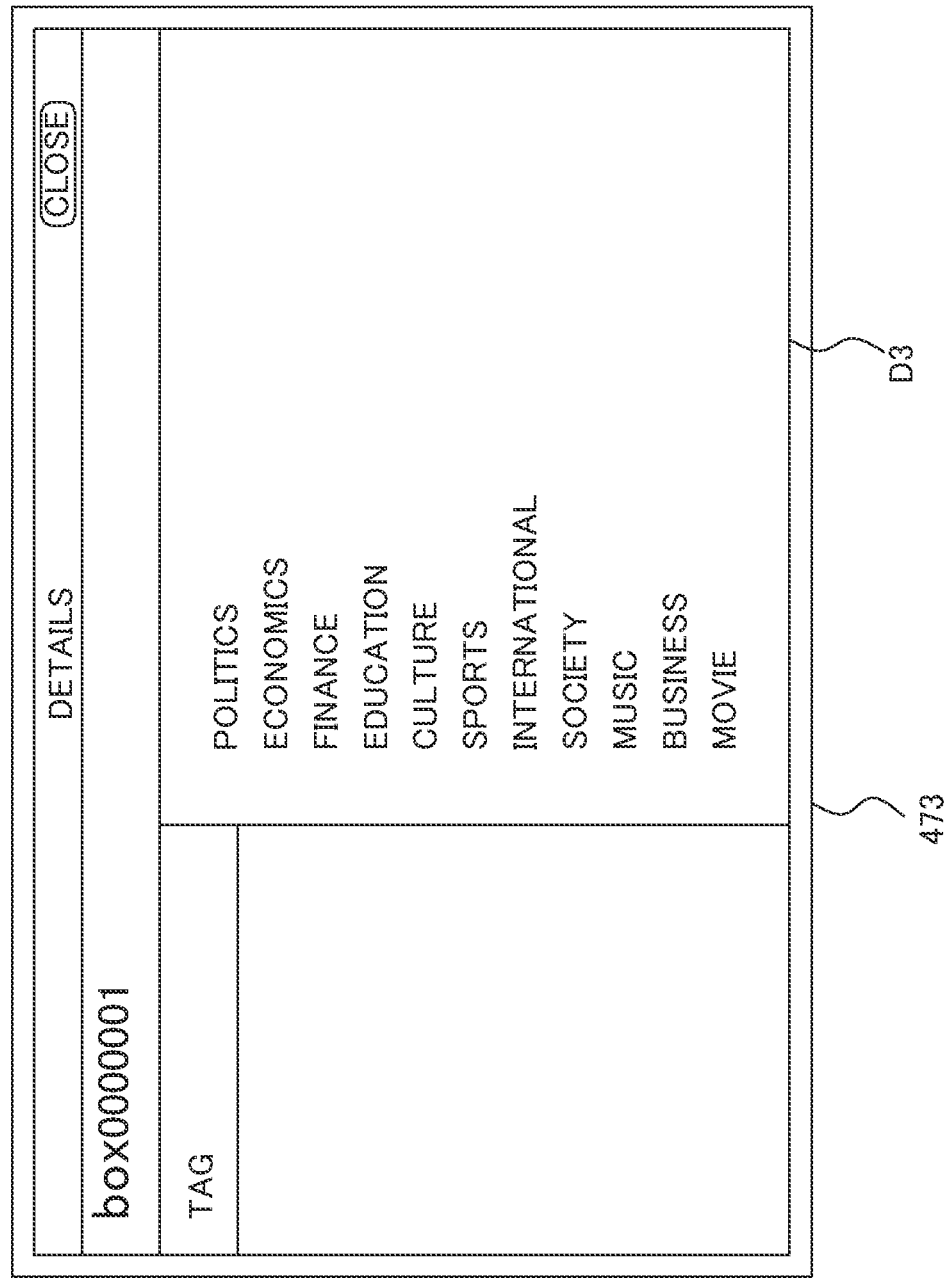
FIG. 5 is a view showing an example of an operation screen displayed on the display device, wherein tags are displayed.

When the operation device 47 accepts a user's gesture on the operation button B31 displayed on the operation screen D2, the controller 100 allows the display device 473 to display, when some of the tags given to the document having a file name of "box0000001" are displayed as an example in FIG. 4, all the tags given to the file name "box0000001" as shown as an example in FIG. 5.

In the first embodiment described above, since the tag generator 102 extracts a single or plurality of topics from the generated topic model and adopts the extracted topics as tags, tags representing features of descriptive (text-based) contents of each document stored in the user box 81 are generated on a document-by-document basis. Therefore, the user can easily extract a necessary document by viewing the tags displayed, together with the file names of the documents, on the display device 473.

For example, it is difficult to know the contents of each document stored in the user box 81 based only on the file name of the document. In addition, as the number of documents stored in the user box 81 increases, a necessary document is more difficult to find. There exists a technique for generating the file name of a document. However, merely generating the file name still gives difficulty in knowing the contents of the document and, therefore, gives difficulty in extracting a necessary document. Unlike this technique, in the above embodiment, a necessary document can be easily extracted.

The reason for giving a tag to a document is to facilitate the search for and organization of the document. Therefore, if a document is given an unlimited number of tags, information on the document becomes overloaded, which makes it even difficult to know the contents of the document and is therefore not preferred. To cope with this, in a second embodiment, the tag generator 102 generates tags up to a predetermined maximum number (for example, five) for each document. For example, when a number of topics exceeding the above maximum can be extracted from a topic model, the tag generator 102 adopts only topics appearing with high frequency as tags.

In another embodiment, as the number of documents stored in the user box 81 (or a specific storage area in the user box 81) increases, the tag generator 102 sets the maximum number of topics to be generated as tags to be smaller. If, with a large number of documents stored in the user box 81, a large number of tags are given to each document, information representing the features of each document becomes overloaded, which makes it even difficult to search for and organize the documents. Therefore, when the maximum number of topics to be generated as tags is set small to simplify the information representing the features of each document, this makes it easy for the user to know the features of the document.

In still another embodiment, the tag generator 102 may change the setting of the maximum number of topics to be generated as tags for each document stored in the user box 81 (or the specific storage area in the user box 81), according to the file size of the document. For example, the tag generator 102 may set the maximum number of topics to be generated as tags for each document (i) to be smaller as the file size of the document increases or (ii) to be smaller as the file size of the document decreases. Particularly, in the case of (i), as the file size of the document increases, the number of topics inevitably increases. However, when the maximum number of topics to be generated is set to be a smaller limited number as the file size increases, even the contents of the document having a large amount of information can be easily known by the user because of simply presented tags.

Next, a description will be given of a third embodiment different from the first embodiment. In the third embodiment, the tag generator 102 generates a predetermined category of tags. Examples of the category include the date, the degree of importance, and classification. For example, when a document is a proposal to hold an event, the tag generator 102 generates the date of the event as a date tag.

The degree-of-importance tag is a tag indicating the degree of importance of a document. For example, the tag generator 102 generates a "degree of importance: high" tag, a "degree of importance: middle" tag or a "degree of importance: low" tag. In this case, keywords are previously given respective degrees of importance. The tag generator 102 determines the degree of importance of each document itself based on the frequency of appearance of keywords having a high degree of importance in the document and gives the document a degree-of-importance tag.

Examples of the classification tag include "politics", "economics", "entertainment", and "sports". The tag generator 102 positively extracts words corresponding to already prepared classification tags from a topic model and adopts them as tags.

Next, a description will be given of a fourth embodiment. FIG. 7 is a functional block diagram schematically showing an essential internal configuration of an image forming apparatus according to a fourth embodiment of the present disclosure. The image forming apparatus 1 according to the fourth embodiment is different from that according to the first embodiment shown in FIG. 1 in that the control device 10 includes, in addition to the configuration thereof in the first embodiment, a log-in processor 103 and an authenticator 104. When the processor operates in accordance with a control program stored in the storage device 8, the control device 10 functions not only as the controller 100, the character recognizer 101, and the tag generator 102, but also as the log-in processor 103 and the authenticator 104.

When the operation device 47 accepts input of log-in information based on a user's operation, the log-in processor 103 determines whether or not the input log-in information is registered. When determining that the input log-in information is registered, the log-in processor 103 permits the user to log in the image forming apparatus 1. In doing so, based on the input log-in information, the log-in processor 103 identifies the user and determines identification information on the user. The log-in processor 103 is an example of the identifier defined in CLAIMS.

The authenticator 104 compares credentials on each of the documents stored in the user box 81 with the identification information on the user determined by the log-in processor 103 to authenticate whether or not the user has authority to use each of the documents stored in the user box 81.

Based on the authentication result of the authenticator 104, the tag generator 102 generates tags for documents which the user has authority to use and does not generate any tag for documents which the user does not have authority to use. This prevents documents which the user does not have authority to use from being more easily referred to because of tag generation.

Figure 6:
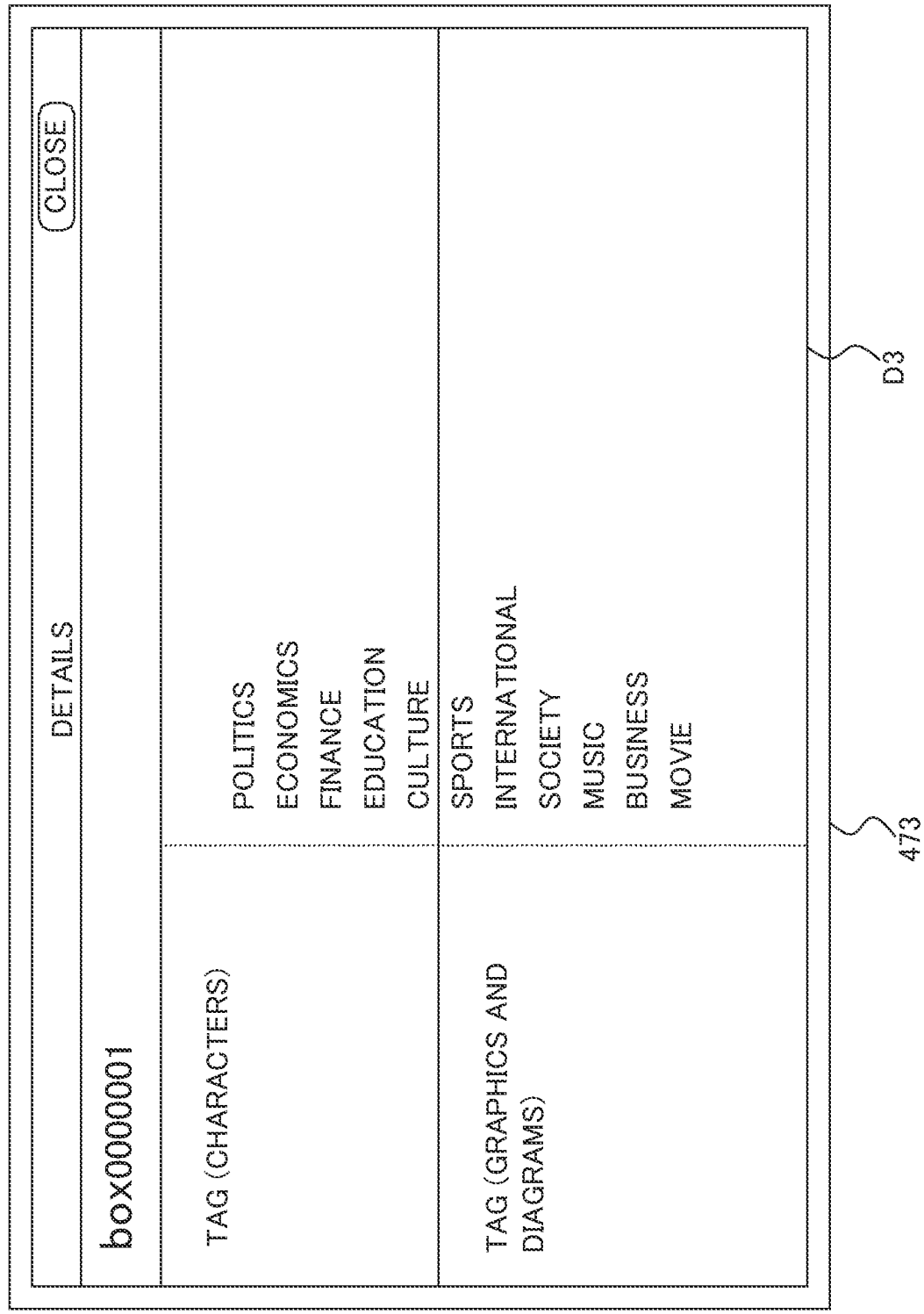
FIG. 6 is a view showing another example of an operation screen displayed on the display device, wherein tags are displayed.

Documents may contain not only characters, but also graphics, such as drawings and photographs, and diagrams, such as tables. In a fifth embodiment, the tag generator 102 analyzes graphics and diagrams contained in a document and generates tags by including features represented by the analyzed graphics and diagrams into the features of descriptive (text-based) contents of the document. Also for graphics and diagrams, the tag generator 102 generates a topic model using an existing image analysis technique. In this case, as shown as an example in FIG. 6, the controller 100 allows the display device 473 to display the tags given to the file name of "box0000001" to separate between the tags formed of topics generated based on a text and the tags formed of topics generated based on graphics and diagrams.

The present disclosure is not limited to the structures and configurations of the above embodiments and can be modified in various ways. The structures, configurations, and processing of the above embodiments described with reference to FIGS. 1 to 7 are merely illustrative of the present disclosure and are not intended to limit the present disclosure to them. The image forming apparatus 1 can be an example of the image reading device defined in CLAIMS. For example, in the configuration of the image forming apparatus 1 described above, a partial configuration at least including the storage device 8 and the control device 10 and a partial configuration further including, in addition to these components, the display device 473 can be examples of the image reading device defined in CLAIMS.

While the present disclosure has been described in detail with reference to the embodiments thereof, it would be apparent to those skilled in the art the various changes and modifications may be made therein within the scope defined by the appended claims.

What is claimed is:

1. An image reading device comprising:
   a storage device that stores a document; and
   a control device that includes a processor and functions, through the processor executing a control program, as
   (i) a character recognizer that analyzes the document stored in the storage device and recognizes characters contained in the document, and
   (ii) a tag generator that analyzes, based on a recognition result of the character recognizer, a sequence of characters contained in the document and generates a tag expressing a feature of descriptive content of the document.

2. The image reading device according to claim 1, further comprising a display device,
   wherein the control device further functions, through the processor executing a control program, as a controller that controls an operation of the display device, and
   the controller allows the display device to display a file name of the document in association with the tag generated by the tag generator.

3. The image reading device according to claim 2, wherein the controller allows the display device to preferentially display a plurality of tags associated with the file name of the document, based on predetermined degrees of importance given to the tags, in descending order from the tag having a higher degree of importance.

4. The image reading device according to claim 3, wherein when the tag is given no degree of importance, the controller sets a priority of display of the tag given no degree of importance at a lowest rank.

5. The image reading device according to claim 3, wherein, in allowing the display device to display the tags according to the degree of importance, the controller allows the display device to display the tag having a higher degree of importance and a higher priority of display in larger-sized characters or in a more prominent display manner.

6. The image reading device according to claim 1, wherein
   the storage device stores, in association with the document, a credential for use to authenticate authority to use the document,
   the control device further functions, through the processor executing a control program, as:
   an identifier that identifies a user; and
   an authenticator that compares the credential stored in the storage device with identification information on the user identified by the identifier to authenticate whether or not the user has authority to use the document stored in the storage device, and
   based on an authentication result of the authenticator, the tag generator generates the tag for the document which the user has authority to use or generates no tag for the document which the user has no authority to use.

7. The image reading device according to claim 1, wherein the tag generator generates, for the individual document, the tags using a predetermined maximum number of topics.

8. The image reading device according to claim 7, wherein as a number of the documents stored in the storage device increases, the tag generator sets the maximum number of tags to be generated for the individual document to be smaller.

9. The image reading device according to claim 7, wherein the tag generator changes, according to a file size of the document stored in the storage device, setting of the maximum number of topics to be generated for the individual document.

10. The image reading device according to claim 9, wherein as the file size of the document stored in the storage device increases, the tag generator sets the maximum number of topics to be generated for the individual document to be smaller.

11. The image reading device according to claim 1, wherein the tag generator analyzes graphics and diagrams contained in the document and generates the tag by including a feature represented by the analyzed graphics and diagrams into the feature of the descriptive content of the document.

12. An image forming apparatus comprising:
   the image reading device according to claim 1; and
   an image forming device that forms an image on a recording medium to print the image,
   wherein the control device further functions, through the processor executing a control program, as a controller that allows the image forming device to execute printing of document image represented by the document stored in the storage device.

* * * * *